United States Patent
Tani et al.

(10) Patent No.: US 10,301,721 B2
(45) Date of Patent: May 28, 2019

(54) CHEMICAL TREATMENT STEEL SHEET, AND METHOD FOR PRODUCING CHEMICAL TREATMENT STEEL SHEET

(71) Applicant: NIPPON STEEL & SUMITOMO METAL CORPORATION, Tokyo (JP)

(72) Inventors: Yoshiaki Tani, Kitakyushu (JP); Shigeru Hirano, Kitakyushu (JP); Akira Tachiki, Kitakyushu (JP); Morio Yanagihara, Hubei (CN); Makoto Kawabata, Chonburi (TH); Hirokazu Yokoya, Onga-gun (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 72 days.

(21) Appl. No.: 15/322,920

(22) PCT Filed: Oct. 8, 2015

(86) PCT No.: PCT/JP2015/078648
§ 371 (c)(1),
(2) Date: Dec. 29, 2016

(87) PCT Pub. No.: WO2016/056627
PCT Pub. Date: Apr. 14, 2016

(65) Prior Publication Data
US 2017/0159185 A1    Jun. 8, 2017

(30) Foreign Application Priority Data
Oct. 9, 2014 (JP) .................................. 2014-207921

(51) Int. Cl.
*C23C 22/36* (2006.01)
*B32B 15/01* (2006.01)
(Continued)

(52) U.S. Cl.
CPC .............. *C23C 22/36* (2013.01); *B32B 15/01* (2013.01); *B32B 15/013* (2013.01); *C23C 2/08* (2013.01);
(Continued)

(58) Field of Classification Search
None
See application file for complete search history.

(56) References Cited

U.S. PATENT DOCUMENTS

| 2013/0209829 A1 | 8/2013 | Suzuki et al. |
| 2013/0216858 A1 | 8/2013 | Suzuki et al. |
| 2015/0167192 A1 | 6/2015 | Tachiki et al. |

FOREIGN PATENT DOCUMENTS

| CN | 102803561 A | 11/2012 |
| EP | 2290129 A1 | 3/2011 |

(Continued)

OTHER PUBLICATIONS

International Search Report (PCT/ISA/210) issued in PCT/JP2015/078648, dated Dec. 22, 2015.
(Continued)

*Primary Examiner* — Daniel J. Schleis
(74) *Attorney, Agent, or Firm* — Birch, Stewart, Kolasch & Birch, LLP

(57) ABSTRACT

A chemical treatment steel sheet includes a steel sheet; a Fe—Sn alloy layer which is formed on at least one surface of the steel sheet; an Sn layer which is formed on the Fe—Sn alloy layer; and a chemical treatment layer that is formed on the Sn layer, and contains a 0.01 to 0.1 mg/m² of Zr compounds in terms of an amount of metal Zr and 0.01 to 5 mg/m² of phosphate compounds in terms of an amount of P. The total Sn content of the Fe—Sn alloy layer and the Sn layer is 0.1 to 15 g/m² of Sn in terms of the amount of metal Sn.

12 Claims, 2 Drawing Sheets

(51) Int. Cl.
    C23C 2/08    (2006.01)
    C25D 11/36   (2006.01)
    C23C 22/73   (2006.01)
    C23C 22/78   (2006.01)
    C23C 2/26    (2006.01)
    C25D 5/50    (2006.01)
    C25D 9/08    (2006.01)
    C23C 28/00   (2006.01)

(52) U.S. Cl.
    CPC ............. *C23C 2/26* (2013.01); *C23C 22/361* (2013.01); *C23C 22/73* (2013.01); *C23C 22/78* (2013.01); *C23C 28/321* (2013.01); *C23C 28/34* (2013.01); *C25D 5/505* (2013.01); *C25D 9/08* (2013.01); *C25D 11/36* (2013.01)

(56) References Cited

FOREIGN PATENT DOCUMENTS

| | | | |
|---|---|---|---|
| JP | 2003-063518 A | | 3/2003 |
| JP | 2007-284789 A | | 3/2003 |
| JP | 2003063518 | * | 3/2003 |
| JP | 2009-001854 A | | 1/2009 |
| JP | 2009001854 | * | 1/2009 |
| JP | 2009-256726 A | | 11/2009 |
| JP | 2012-62519 A | | 3/2012 |
| JP | 2014-095121 A | | 5/2012 |
| JP | 2014095121 | * | 5/2014 |
| TW | 201217578 A1 | | 5/2012 |

OTHER PUBLICATIONS

Office Action issued in Taiwanese Patent Application No. 104133263, dated Jun. 2, 2016.
Written Opinion (PCT/ISA/237) issued in PCT/JP2015/078648, dated Dec. 22, 2015.
Korean Office Action, dated Dec. 1, 2017, for counterpart Korean Application No. 10-2017-7003788, along with an English translation.
Extended European Search Report, dated Jan. 25, 2018, for counterpart European Application No. 15848678.7.

* cited by examiner

CHEMICAL TREATMENT STEEL SHEET, AND METHOD FOR PRODUCING CHEMICAL TREATMENT STEEL SHEET

TECHNICAL FIELD OF THE INVENTION

The present invention relates to a chemical treatment steel sheet, and a method for producing a chemical treatment steel sheet.

Priority is claimed on Japanese Patent Application No. 2014-207921, filed on Oct. 9, 2014, the content of which is incorporated herein by reference.

RELATED ART

When continuously using a metal, there is a concern that corrosion may occur. In the related art, various technologies are suggested so as to prevent corrosion from occurring in a metal. Examples of the technologies which are suggested include a technology of performing plating with respect to a metal sheet, and a technology of performing various surface treatments with respect to a surface of a metal sheet or plating.

Here, a Ni-plated steel sheet, a Sn-plated steel sheet, a Sn-based alloy plated steel sheet, and the like are used to manufacture a metal container that is intended to preserve drinks or food.

In a case of using a Ni-plated steel sheet, a Sn-plated steel sheet, or a Sn-based alloy plated steel sheet as a steel sheet for metal containers (hereinafter, referred to as "steel sheet for containers") that is intended to preserve drinks or food, a chemical treatment is performed with respect to a surface of the plated steel sheet with hexavalent chromium so as to secure adhesion between the steel sheet and a coating or a film, and corrosion resistance in many cases. The chemical treatment using a hexavalent chromium-containing solution is referred to as a chromate treatment.

However, the hexavalent chromium that is used in the chromate treatment is harmful in an environmental aspect, and thus a chemical treatment film such as Zr-phosphorous film has been developed as a substitute for the chromate treatment that is performed for the steel sheet for containers in the related art. For example, Patent Document 1 discloses a steel sheet for containers which includes a chemical treatment film that contains Zr, phosphoric acid, a phenol resin, and the like.

PRIOR ART DOCUMENT

Patent Document

[Patent Document 1] Japanese Unexamined Patent Application, First Publication No. 2007-284789

DISCLOSURE OF THE INVENTION

Problems to be Solved by the Invention

In a case of using the chemical treatment steel sheet, in which the chemical treatment film disclosed in Patent Document 1 is formed on a surface of a Sn-plated steel sheet, as a steel sheet for containers intended to store acidic contents such as acidic fruit, it is possible to use the chemical treatment steel sheet in a state in which the chemical treatment film and the contents come into direct contact with each other without carrying out coating on the surface of the chemical treatment film. Since coating is not performed on the surface of the chemical treatment film, Sn that is eluted from the Sn-coated steel sheet and $O_2$ in the contents cause a reaction, and thus it is possible to prevent oxidation of the contents.

However, from a result of examination by the present inventors, the present inventors have obtained the following finding. Since the chemical treatment film, in which a surface is not subjected to coating, is discolored and turns yellow (yellowing) in accordance with a variation with the elapse of time, there is a problem in that the exterior appearance deteriorates.

In addition, in a case of using the chemical treatment steel sheet, in which the chemical treatment film disclosed in Patent Document 1 is formed on a surface of a Sn-plated steel sheet, as the steel sheet for containers, the chemical treatment steel sheet is required to have additional corrosion resistance.

The invention has been made in consideration of the above-described circumstances, and an object thereof is to provide a chemical treatment steel sheet having excellent yellowing resistance and corrosion resistance, and a method for producing the chemical treatment steel sheet.

Means for Solving the Problem

The invention employs the following means to solve the above-mentioned problems and to accomplish the object.

(1) According to an aspect of the invention, a chemical treatment steel sheet includes: a steel sheet; a Fe—Sn alloy layer which is formed on at least one surface of the steel sheet; an Sn layer which is formed on the Fe—Sn alloy layer; and a chemical treatment layer that is formed on the Sn layer, and contains a 0.01 to 0.1 mg/m$^2$ of Zr compounds in terms of the amount of metal Zr and 0.01 to 5 mg/m$^2$ of phosphate compounds in terms of an amount of P. The total Sn content of the Fe—Sn alloy layer and the Sn layer is 0.1 to 15 g/m$^2$ of Sn in terms of the amount of metal Sn.

(2) In the chemical treatment steel sheet according to (1), the chemical treatment layer may contain 0.08 mg/m$^2$ or less of Zr compounds in terms of the amount of metal Zr.

(3) In the chemical treatment steel sheet according to (2), the chemical treatment layer may contain 0.06 mg/m$^2$ or less of the Zr compounds in terms of the amount of metal Zr.

(4) In the chemical treatment steel sheet according to any one of (1) to (3), the chemical treatment layer may contain 0.02 mg/m$^2$ or more of the Zr compounds in terms of the amount of metal Zr.

(5) In the chemical treatment steel sheet according to any one of (1) to (4), the chemical treatment layer may contain 4 mg/m$^2$ or less of the phosphate compounds in terms of the amount of P.

(6) In the chemical treatment steel sheet according to any one of (1) to (5), the chemical treatment layer may contain less than 1 mg/m$^2$ of the phosphate compounds in terms of the amount of P.

(7) In the chemical treatment steel sheet according to any one of (1) to (6), the chemical treatment layer may contain 0.03 mg/m$^2$ or more of the phosphate compounds in terms of the amount of P.

(8) In the chemical treatment steel sheet according to any one of (1) to (7), when a variation amount in a yellowness index before and after storage for 4 weeks in an environment of a temperature of 40° C. and a humidity of 80% at one measurement point on an outermost surface of the chemical treatment layer is set as $\Delta YI$, an average value of the $\Delta YI$ obtained at the measurement points included in a unit area of the outermost surface may be less than 1.7.

(9) In the chemical treatment steel sheet according to any one of (1) to (8), the total Sn content of the Fe—Sn alloy layer and the Sn layer may be 0.5 to 13 g/m² of Sn in terms of the amount of metal Sn.

(10) In the chemical treatment steel sheet according to any one of (1) to (9), a surface of the chemical treatment layer may not be coated with a film or a coating.

(11) According to another aspect of the invention, a method for producing a chemical treatment steel sheet includes: a plating process of forming an Sn coated layer that contains 0.1 to 15 g/m² of Sn in terms of an amount of metal Sn on a surface of a steel sheet; a reflow process of forming an Fe—Sn alloy layer and an Sn layer by performing reflow treatment to the Sn coated layer; and a chemical treatment process of forming a chemical treatment layer on the Sn layer by performing an electrolytic treatment in a chemical treatment liquid, which contains 10 ppm to less than 500 ppm of Zr ions, 10 to 20000 ppm of F ions, 10 to 3000 ppm of phosphate ions, and 100 to 30000 ppm in a total amount of nitrate ions and sulfate ions and of which a temperature is set to equal to or higher than 5° C. and lower than 90° C., under conditions of a current density of 0.5 to 20 A/dm² and an electrolytic treatment time of 0.05 to 10 seconds, or by performing an immersion treatment in the chemical treatment liquid for an immersion time of 0.2 to 100 seconds.

(12) In the method for producing a chemical treatment steel sheet according to (11), the chemical treatment liquid may contain 100 ppm to less than 500 ppm of Zr ions, 100 to 17000 ppm of F ions, 20 to 2000 ppm of phosphate ions, and 1000 to 20000 ppm in the total amount of nitrate ions and sulfate ions.

Effects of the Invention

According to the aspects, it is possible to provide a chemical treatment steel sheet having excellent yellowing resistance and corrosion resistance, and a method for producing the chemical treatment steel sheet.

EMBODIMENTS OF THE INVENTION

Figure 1A:
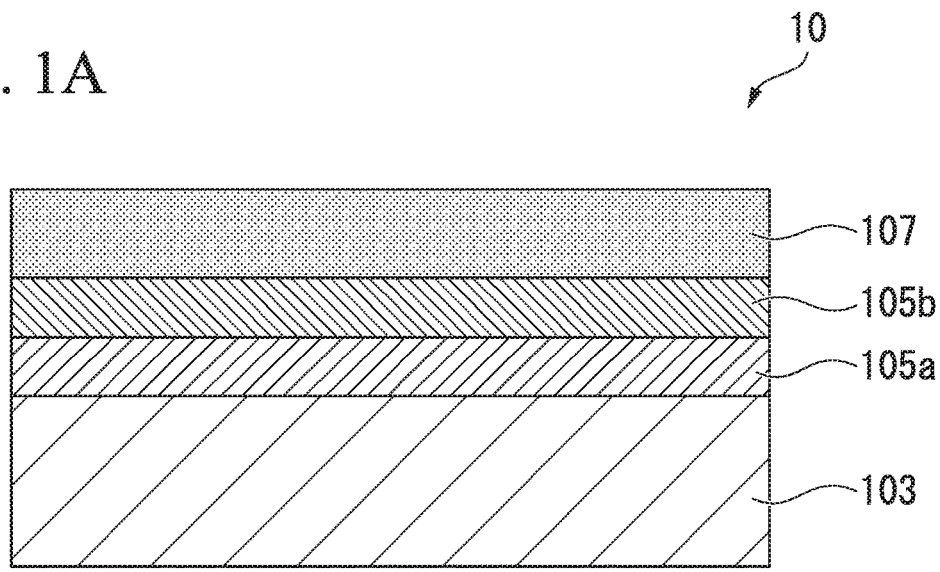
FIG. 1A is a view schematically showing an example of a chemical treatment steel sheet in which a Fe—Sn alloy layer, an Sn layer and a chemical treatment layer are formed on a single surface of a steel sheet.

Hereinafter, a preferred embodiment of the invention will be described in detail with reference to the accompanying drawings. Furthermore, in this embodiment, the same reference numeral will be given to constituent elements having the same configuration, and a redundant description thereof will be omitted.

<With Respect to Configuration of Chemical Treatment Steel Sheet>

Figure 1B:
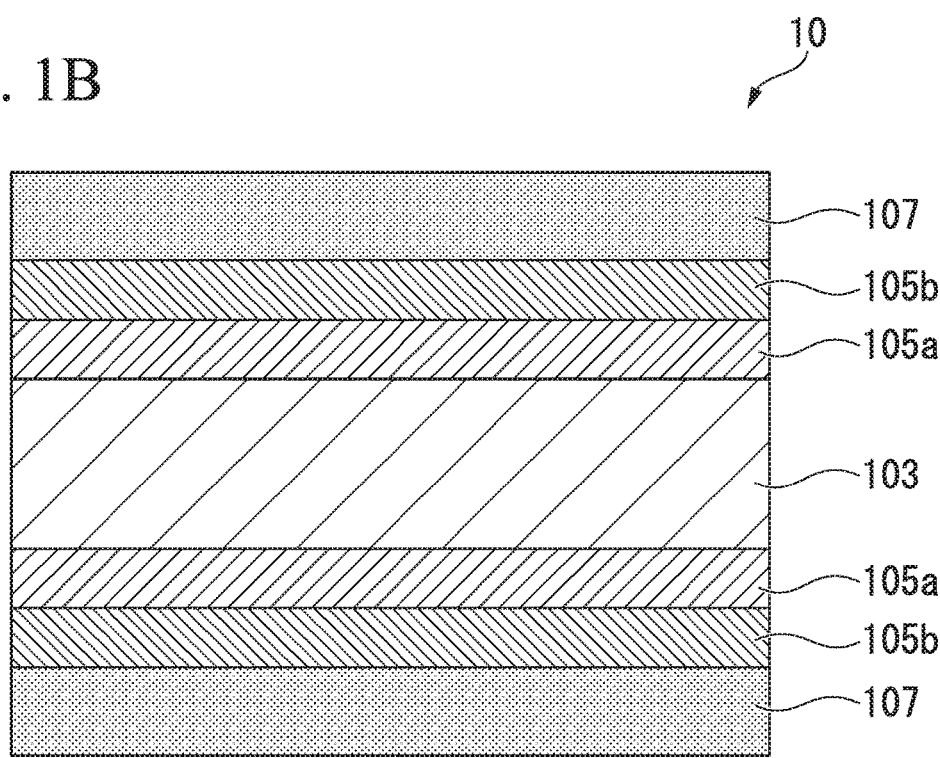
FIG. 1B is a view schematically showing an example of the chemical treatment steel sheet in which the Fe—Sn alloy layer, the Sn layer and the chemical treatment layer are formed on both surfaces of the steel sheet.

First, a configuration of a chemical treatment steel sheet according to an embodiment of the invention will be described in detail with reference to FIG. 1A and FIG. 1B. FIG. 1A and FIG. 1B schematically show a layer structure of the chemical treatment steel sheet according to this embodiment when seen from a lateral side.

As shown in FIG. 1A and FIG. 1B, a chemical treatment steel sheet 10 according to this embodiment includes a steel sheet 103, a Fe—Sn alloy layer 105a, an Sn layer 105b, and a chemical treatment layer 107. Furthermore, the Fe—Sn alloy layer 105a, the Sn layer 105b and the chemical treatment layer 107 may be formed on a single surface of the steel sheet 103 as shown in FIG. 1A, or may be formed on both surfaces of the steel sheet 103 as shown in FIG. 1B.

[With Respect to Steel Sheet 103]

The steel sheet 103 is used as a base metal of the chemical treatment steel sheet 10 according to this embodiment. With respect to the steel sheet 103 that is used in this embodiment, a known steel sheet 103 that is used as a steel sheet for containers may be used without particular limitation. In addition, with respect to a method for producing the steel sheet 103 and a material thereof, a steel sheet 103, which is produced through from a typical billet producing process to a known process such as hot-rolling, pickling, cold-rolling, annealing, and temper rolling, may be used without particular limitation.

It is preferable that the sheet thickness of the steel sheet 103 is 0.05 to 1 mm in consideration of practicability and economic efficiency in a case of being used as a steel sheet for containers.

[With Respect to Fe—Sn Alloy Layer 105a and Sn Layer 105b]

The Fe—Sn alloy layer 105a is formed on a surface of the steel sheet 103 and the Sn layer 105b is formed on the Fe—Sn alloy layer 105a. The Fe—Sn alloy layer 105a and the Sn layer 105b are barrier-type plating layers. The barrier-type plating layer is a plating layer that reduces corrosion of the steel sheet 103 by forming a metal film of Sn on the surface of the steel sheet 103 by using Sn that is a more electrochemically noble metal in comparison to Fe that constitutes the steel sheet 103 that is the base metal in order for a corrosion factor not to act on the base metal.

Hereinafter, an example of the Fe—Sn alloy layer 105a and the Sn layer 105b according to this embodiment will be described in detail with reference to FIGS. 1A and 1B.

As shown in FIGS. 1A and 1B, the Fe—Sn alloy layer 105a is formed on at least a single surface of the steel sheet 103, and the Sn layer 105b is formed on the Fe—Sn alloy layer 105a. Although details will be described later, the Fe—Sn alloy layer 105a and the Sn layer 105b are formed by performing a tin melting treatment (reflow treatment) and thereby alloying a part of an Sn coated layer (not shown) with Fe of the steel sheet 103 in a state that the Sn coated layer (not shown) is formed on the surface of the steel sheet 103.

The Sn coated layer (not shown) in this embodiment may be configured only by Sn, or may contains an impurity or a slight amount of element in addition to Sn.

The Sn coated layer (not shown) is formed to secure the corrosion resistance and weldability of the chemical treatment steel sheet 10. Sn itself has high corrosion resistance, and an Sn alloy formed through the tin melting treatment also has excellent corrosion resistance and weldability.

After forming the Sn coated layer (not shown), the tin melting treatment is performed. According to this, the Fe—Sn alloy layer 105a is formed on the steel sheet 103, and the Sn layer 105b is formed on the Fe—Sn alloy layer 105a.

The total Sn content of the Fe—Sn alloy layer 105a and the Sn layer 105b is 0.1 to 15 g/m² of Sn per single surface in terms of the amount of metal Sn.

Sn has excellent workability, weldability, and corrosion resistance. When the tin melting treatment is performed after Sn plating, it is possible to further improve the corrosion resistance of the chemical treatment steel sheet 10, and it is possible to attain a more preferred surface exterior appearance (mirror surface exterior appearance) of the chemical treatment steel sheet 10. The Fe—Sn alloy layer 105a and the Sn layer 105b are required to contain 0.1 g/m$^2$ or more of Sn per single surface in terms of the amount of metal Sn so as to exhibit the above-described effect.

However, when the total Sn content of the Fe—Sn alloy layer 105a and the Sn layer 105b is greater than 15 g/m$^2$ per single surface in terms of the amount of metal Sn, the above-described effect with Sn becomes saturated. In addition, when the total Sn content of the Fe—Sn alloy layer 105a and the Sn layer 105b is greater than 15 g/m$^2$ per single surface in terms of the amount of metal Sn, this is not preferable from an economical aspect. For the above-described reason, the total Sn content of the Fe—Sn alloy layer 105a and the Sn layer 105b is set to 15 g/m$^2$ or less per single surface in terms of the amount of metal Sn.

More preferably, the total Sn content of the Fe—Sn alloy layer 105a and the Sn layer 105b is 0.5 g/m$^2$ to 13 g/m$^2$ per single surface in terms of the amount of metal Sn. When the total Sn content of the Fe—Sn alloy layer 105a and the Sn layer 105b is 0.5 g/m$^2$ to 13 g/m$^2$ per single surface in terms of the amount of metal Sn, it is possible to increase the corrosion resistance of the chemical treatment steel sheet 10 preferably by Sn and further reduce the production cost.

In addition, the thick ratio between the Fe—Sn alloy layer 105a and the Sn layer 105b is not particularly limited. The Fe—Sn alloy layer 105a and the Sn layer 105b are only required to contain the above-described amount of Sn in total.

The Fe—Sn alloy layer 105a contain 0.001 to 100 g/m$^2$ of Fe per single surface in terms of the amount of metal Fe. In addition, the Fe—Sn alloy layer 105a may contain unavoidable impurities other than Sn and Fe which are mixed-in in a production process and the like.

In the Fe—Sn alloy layer 105a, the total of the amount of Fe contained in terms of the amount of metal Fe and the amount of Sn in terms of the amount of metal Sn is 50% by mass or more. Preferably, in the Fe—Sn alloy layer 105a, the total amount of Fe contained in terms of the amount of metal Fe and the amount of Sn contained in terms of the amount of metal Sn is 70% by mass or more.

The Sn layer 105b may be constitute of Sn only or may contain 0.001 to 6 g/m$^2$ in terms of the amount of metal Fe in addition to Sn. In addition, the Sn layer 105b may contain unavoidable impurities which are mixed-in in a production process and the like.

In the Sn layer 105b, the amount of Sn in terms of the amount of metal Sn is 50% by mass or more. Preferably, in the Sn layer 105b, the amount of Sn in terms of the amount of metal Sn is 70% by mass or more.

In a case of using the steel sheet 103, on which the Fe—Sn alloy layer 105a and the Sn layer 105b are formed, as a steel sheet for containers which store acidic contents such as acidic fruits, a coating treatment is not performed on a surface that comes into contact with the acidic contents. When the Sn layer 105b and the acidic contents come into direct contact with each other, Sn in the Sn layer 105b is eluted, and is likely to react with $O_2$ contained in the contents. According to this, oxidation of the acidic contents is prevented.

However, SnO, which is generated through a reaction between Sn and $O_2$, is a yellow compound. According to this, the surface of the steel sheet 103, on which the Fe—Sn alloy layer 105a and the Sn layer 105b are formed, is discolored and turns yellow (yellowing) according to the formation of SnO. When the yellowing occurs, the contents may be misunderstood as decaying, and thus the yellowing is not preferable. According to this, the present inventors have thought of a configuration in which the chemical treatment layer 107 is formed on the Sn layer 105b so as to suppress the yellowing of the surface of the steel sheet 103 on which the Fe—Sn alloy layer 105a and the Sn layer 105b are formed.

The present inventors have obtained the following finding. In a case where the chemical treatment layer 107 that contains Zr is formed on the Sn layer 105b, the adhered amount of the chemical treatment layer 107 becomes equal to or greater than a predetermined amount, the chemical treatment layer 107 is gradually discolored and turns yellow.

Accordingly, the present inventors have made an additional investigation, and have found a chemical treatment steel sheet 10 in which the yellowing of the chemical treatment layer 107 that contains Zr is suppressed, and satisfactory external appearance is maintained. That is, in the invention, the chemical treatment layer 107, of which an adhered amount is in a specific range and which contains Zr, is formed on the Sn layer 105b.

[With Respect to Chemical Treatment Layer 107]

As shown in FIG. 1A and FIG. 1B, the chemical treatment layer 107 is formed on the Sn layer 105b. The chemical treatment layer 107 is a composite film layer that mainly contains a Zr compound, and contains a 0.01 to 0.1 mg/m$^2$ of Zr compounds per single surface in terms of the amount of metal Zr and 0.01 to 5 mg/m$^2$ of phosphate compounds per single surface in terms of the amount of P.

In a case where two films of a Zr film that contains the Zr compounds and a phosphate film that contains the phosphate compounds are formed on the Sn layer 105b in a state in which the two films overlap each other, a certain degree of effect is obtained on corrosion resistance or adhesion, but the effect is not sufficient in practical use. However, as is the case with this embodiment, when the Zr compounds and the phosphate compounds exist in the chemical treatment layer 107 in a state of being partially mixed, it is possible to attain more excellent corrosion resistance and adhesion in comparison to the case where the two films are formed to overlap each other as described above.

The Zr compound, which is contained in the chemical treatment layer 107 according to this embodiment, has a function of improving corrosion resistance, adhesion, and working adhesion. Examples of the Zr compounds according to this embodiment include Zr oxide, Zr phosphate, Zr hydroxide, Zr fluoride, and the like, and the chemical treatment layer 107 contains a plurality of the Zr compounds. A preferred combination of the Zr compounds is a combination of the Zr oxide, the Zr phosphate, and the Zr fluoride.

In a case where the amount of the Zr compounds contained in the chemical treatment layer 107 is 0.01 mg/m$^2$ or more per single surface in terms of the amount of metal Zr, corrosion resistance, adhesion of a coating and the like, and yellowing resistance, which are suitable in practical use, are secured.

On the other hand, as the amount of the Zr compounds contained increases, corrosion resistance, adhesion, and adhesion of a coating and the like are improved. However, when the amount of the Zr compounds contained is greater than 0.1 mg/m$^2$ per single surface in terms of the amount of metal Zr, yellowing characteristics of the chemical treatment layer 107 in accordance with a variation with the passage of time become significant. Accordingly, the chemical treatment layer 107 according to this embodiment contains 0.01 mg/m$^2$ to 0.1 mg/m$^2$ of Zr compounds per single surface in terms the amount of metal Zr.

The upper limit of the amount of Zr compounds contained is preferably 0.08 mg/m$^2$ or less per single surface in terms of the amount of metal Zr, and more preferably 0.06 mg/m$^2$ or less per single surface in terms of the amount of metal Zr.

In addition, the lower limit of the amount of the Zr compounds contained is preferably 0.02 mg/m$^2$ or more per single surface in terms of the amount of metal Zr.

When the amount of the Zr compounds contained is set to the above-described range, it is possible to attain more excellent corrosion resistance, adhesion, adhesion of a coating and the like, and yellowing resistance.

The chemical treatment layer 107 further contains one or more kinds of phosphate compounds in addition to the above-described Zr compound.

The phosphate compounds according to this embodiment has a function of improving corrosion resistance, adhesion, and working adhesion. Examples of the phosphate compounds according to this embodiment include Fe phosphate, Sn phosphate, Zr phosphate, and the like which are formed through a reaction between phosphate ions and compounds which are included in the steel sheet 103, the Fe—Sn alloy layer 105a, the Sn layer 105b, and the chemical treatment layer 107. The chemical treatment layer 107 may contain one kind or two or more kinds of the phosphate compounds.

The greater the amount of the phosphate compounds contained in the chemical treatment layer 107 is, the further corrosion resistance, adhesion, and working adhesion of the chemical treatment steel sheet 10 are improved. Specifically, in a case where the amount of the phosphate compounds contained in the chemical treatment layer 107 is greater than 0.01 mg/m$^2$ per single surface in terms of the amount of P, corrosion resistance, adhesion, adhesion of working and the like, and yellowing resistance, which are suitable in practical use, are secured.

On the other hand, as the amount of the phosphate compounds contained increases, corrosion resistance, adhesion, and working adhesion are also improved. However, when the amount of the phosphate compounds contained is greater than 5 mg/m$^2$ per single surface in terms of the amount of P, the yellowing characteristics of the chemical treatment layer 107 in accordance with a variation with the passage of time become significant. Accordingly, the chemical treatment layer 107 according to this embodiment contains 0.01 mg/m$^2$ to 5 mg/m$^2$ of phosphate compounds per single surface in terms the amount of P.

The upper limit of the amount of phosphate compounds contained is preferably 4 mg/m$^2$ or less per single surface in terms of the amount of P, and more preferably less than 1 mg/m$^2$ per single surface in terms of the amount of P.

In addition, the lower limit of the amount of the phosphate compounds contained is preferably 0.03 mg/m$^2$ or more per single surface in terms of the amount of P. When the amount of the phosphate compounds contained is set to the above-described range, it is possible to attain more excellent corrosion resistance, adhesion, working adhesion, and yellowing resistance.

Furthermore, the chemical treatment layer 107 may further contain unavoidable impurities which are mixed-in in a production process and the like in addition to the Zr compounds and the phosphate compound. In addition, in a case where the chemical treatment layer 107 contains Cr, the upper limit of the amount of Cr contained is 2 mg/m$^2$.

The chemical treatment steel sheet 10 according to this embodiment includes the above-described chemical treatment layer 107, and thus exhibits excellent yellowing resistance. For example, when the chemical treatment steel sheet 10 is used for storage for 4 weeks in an environment of a temperature of 40° C. and a humidity of 80%, a value (hereinafter, referred to as "ΔYI value"), which is obtained by extracting a YI value of the chemical treatment steel sheet before storage from a YI value (yellowness index) of the chemical treatment steel sheet after storage, is 1.7 or less. That is, the ΔYI value in a case of storage for 4 weeks in an environment of a temperature of 40° C. and a humidity of 80% is 1.7 or less.

The YI value is a value obtained by digitizing tristimulus values (perceiving sensitivity of red, blue, and yellow which are sensed by eyes of human beings) of a color. As the YI value shows a value that is higher on a positive side, yellow becomes dark. As the YI value shows a value that is higher on a negative side, bluish white becomes dark. Accordingly, after storage in the above-described environment, in a case where the ΔYI value is a positive value, this case represents an increase in the yellowness index, and in a case where the ΔYI value is a negative value, this case represents a decrease in the yellowness index and an increase in the degree of bluish-whiteness.

Furthermore, the YI value is calculated by substituting tristimulus values X, Y, and Z obtained by using a white measurement meter into the following Expression (1).

$$YI \text{ value}=100(1.28X-1.06Z)\div Y \quad (1)$$

Here, in a case where the ΔYI value is greater than 1.7, it is possible to perceive that an object turns yellow. On the other hand, in a case the chemical treatment steel sheet 10 according to this embodiment is stored for 4 weeks in an environment of a temperature of 40° C. and a humidity of 80%, the ΔYI value before and after storage is 1.7 or less. That is, in a case of comparing the yellowness index of the chemical treatment steel sheet 10 after storage for 4 weeks in an environment of a temperature of 40° C. and a humidity of 80%, and the yellowness index of the chemical treatment steel sheet 10 before storage, it is difficult to perceive an increase (yellowing) in the yellowness index of the chemical treatment steel sheet 10. According to this, in the chemical treatment steel sheet 10 according to this embodiment, the yellowness index in the exterior appearance does not vary with the passage of time, and satisfactory exterior appearance can be maintained for a long period of time.

Furthermore, in this embodiment, the performance of maintaining the satisfactory exterior appearance for a long period of time is referred to as "yellowing resistance".

As described above, the chemical treatment steel sheet 10 according to the present embodiment has excellent yellowing resistance and corrosion resistance. Accordingly, it is possible to use the chemical treatment steel sheet 10 as a steel sheet for container when the surface of the chemical treatment layer 107 is not coated with film or lacquer.

<With Respect to Layer Structure of Chemical Treatment Steel Sheet 10>

As described above, the chemical treatment steel sheet 10 includes the Fe—Sn alloy layer 105a on the steel sheet 103, the Sn layer 105b on the Fe—Sn alloy layer 105a and the chemical treatment layer 107 on the Sn layer 105b. That is, in the chemical treatment steel sheet 10, the steel sheet 103 and the Fe—Sn alloy layer 105a are in contact with each other, and another layer is not provided between the steel sheet 103 and the Fe—Sn alloy layer 105a. Similarly, in the chemical treatment steel sheet 10, the Fe—Sn alloy layer 105a and the Sn layer 105b are in contact with each other, and another layer is not provided between the Fe—Sn alloy layer 105a and the Sn layer 105b. Furthermore, in the chemical treatment steel sheet 10, the Sn layer 105b and the chemical treatment layer 107 are in contact with each other, and another layer is not provided between the Sn layer 105b and the chemical treatment layer 107.

<With Respect to Method of Measuring Amount of Component Contained>

Here, for example, the amount of metal Sn in the Fe—Sn alloy layer 105a and the Sn layer 105b can be measured by using a fluorescent X-ray method. In this case, the calibration curve with respect to the amount of metal Sn is created in advance by using a known sample for measurement of the amount of metal Sn, and the amount of metal Sn is relatively specified by using the calibration curve that is created.

For example, the amount of metal Zr and the amount of P in the chemical treatment layer 107 can be measured by quantitative analysis such as fluorescent X-ray analysis. In addition, it is possible to specify existence of a compound in the chemical treatment layer 107 by performing analysis with X-ray photoelectron spectroscopy (XPS).

Furthermore, the method of measuring each component is not limited to the above-described method, and a known measurement method can be applied thereto.

<With Respect to Method of Measuring YI Value>

Measurement of the YI value (yellowness index) may be performed by using a spectrophotometer based on JIS Z-8722 condition c. With regard to a measurement type, the measurement can be performed through SCI (including regular reflection light) measurement that is less susceptible to an effect by a surface property. In addition, with regard to measurement conditions, it is important to perform the measurement under constant conditions such as a constant light source, constant humidity, and a constant temperature.

Furthermore, in measurement of the YI value, for example, it is preferable to measure YI values at a plurality of measurement points such as arbitrary 20 points per 1 m$^2$, and to use an average value thereof. Here, the measurement points represent a plurality of arbitrary measurement points on a single surface at the outermost surface portion of the chemical treatment layer 107. In addition, it is preferable that the measurement points are set to points which are spaced away from each other by at least 10 cm. Specifically, in a case of a large sheet having dimensions of 1 m×1 m, it is preferable measurement points are sampled, and points spaced away from each other by 10 cm or more are sampled to perform measurement.

<With Respect to Method of Producing Chemical Treatment Steel Sheet>

Figure 2:
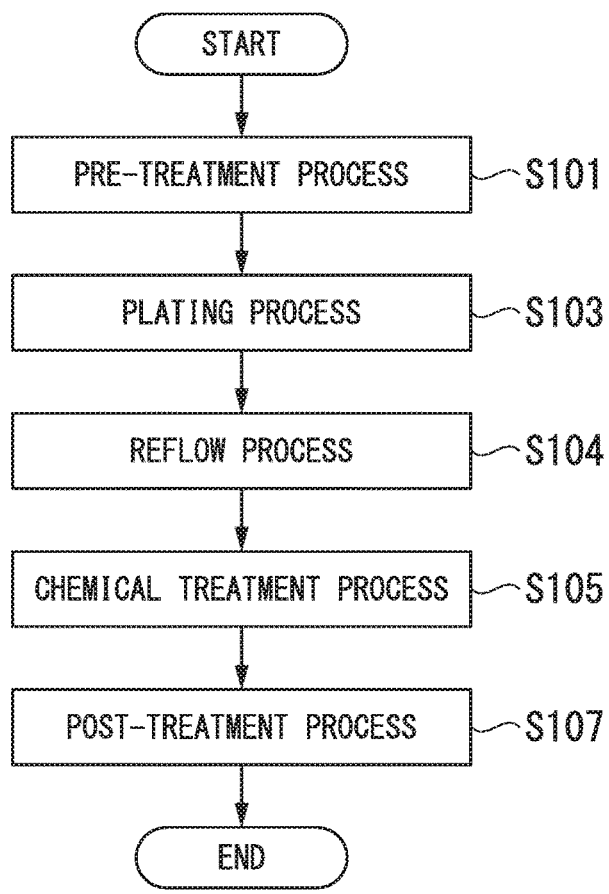
FIG. 2 is a flow chart showing an example of a flow of a method of producing the chemical treatment steel sheet.

Next, a method of producing the chemical treatment steel sheet 10 according to this embodiment will be described in detail with reference to FIG. 2. FIG. 2 is a flowchart showing an example of a flow of the method of producing the chemical treatment steel sheet according to this embodiment.

[Pre-Treatment Process]

In the method of producing the chemical treatment steel sheet 10 according to this embodiment, first, a known preliminary treatment is performed with respect to the steel sheet 103 as necessary (step S101).

[Plating Process]

Then, the Sn coated layer (not shown) is formed on a surface of the steel sheet 103 (step S103). The method of forming the Sn coated layer (not shown) is not particularly limited. A known electric plating method, a method of immersing the steel sheet 103 in molten Sn for plating, and the like can be used.

[Tin Melting Treatment (Reflow Treatment) Process]

After forming the Sn coated layer (not shown), a tin melting treatment (reflow treatment) is performed (step S104). According to the tin melting treatment, the Fe—Sn alloy layer 105a and the Sn layer 105b are formed on the steel sheet 103.

The tin melting treatment is performed by heating the steel sheet 103 which has the Sn coated layer (not shown) at 200° C. or higher after the Sn coated layer (not shown) is formed and thereby causing the Sn layer (not shown) to be melted once. After the heating, rapid cooling is performed. According to the tin melting treatment, Sn in the Sn coated layer (not shown) which is positioned at the steel sheet side 103 is alloyed with Fe in the steel sheet 103, and thereby the Fe—Sn alloy layer 105a is formed and the remainder Sn forms the Sn layer 105b.

[Chemical Treatment Process]

Then, the chemical treatment layer 107 is formed on the Sn layer 105b through a cathode electrolytic treatment or an immersion treatment (step S105).

The chemical treatment layer 107 is formed through a cathode electrolytic treatment or an immersion treatment, but a chemical treatment liquid is used in any case. The chemical treatment liquid according to this embodiment contains 10 ppm to less than 500 ppm of Zr ions, 10 ppm to 20000 ppm of F ions, 10 ppm to 3000 ppm of phosphate ions, and 100 ppm to 30000 ppm in a total amount of nitrate ions and sulfate ions.

In addition, the nitrate ions and the sulfate ions may be contained in the chemical treatment liquid in a total amount of 100 ppm to 30000 ppm. Both of the nitrate ions and the sulfate ions may be contained in the chemical treatment liquid, or only any one of the nitrate ions and the sulfate ions may be contained in the chemical treatment liquid.

It is preferable that the chemical treatment liquid contains 100 ppm to less than 500 ppm of Zr ions, 100 ppm to 17000 ppm of F ions, 20 ppm to 2000 ppm of phosphate ions, and 1000 ppm to 20000 ppm in a total amount of nitrate ions and sulfate ions.

When the concentration of the Zr ions is set to 100 ppm or greater, it is possible to more reliably prevent a decrease in an adhered amount of Zr. In addition, when the concentration of the F ions is set to 100 ppm or greater, it is possible to more reliably prevent white turbidity of the chemical treatment layer 107 in accordance with precipitation of a phosphate.

Similarly, when the concentration of the phosphate ions is set to 20 ppm or greater, it is possible to more reliably prevent white turbidity of the chemical treatment layer 107 in accordance with precipitation of the phosphate.

When the total concentration of the nitrate ions and the sulfate ions is set to 1000 ppm or greater, it is possible to more reliably prevent a decrease in adhesion efficiency of the chemical treatment layer 107.

In a case where the total concentration of the nitrate ions and the sulfate ions is less than 1000 ppm, the adhesion efficiency of the Zr ions is low, and thus the amount of Zr contained in the chemical treatment layer 107 decreases. Accordingly, this case is not preferable. On the other hand, when the total concentration of the nitrate ions and the sulfate ions is greater than 20000 ppm, the adhesion efficiency of the Zr ions is high, and thus the amount of Zr contained in the chemical treatment layer 107 excessively increases. Accordingly, this case is not preferable.

Furthermore, when the upper limits of the respective components in the chemical treatment liquid are set to the above-described values, it is possible to more reliably reduce the production cost of the chemical treatment layer 107.

It is preferable that pH of the chemical treatment liquid is in a range of 3.1 to 3.7, and more preferably approximately 3.5. Nitric acid, ammonia, and the like may be added to the chemical treatment liquid for adjustment of pH thereof as necessary. Furthermore, even in any of the chemical treatment liquid that is used in the electrolytic treatment and the chemical treatment liquid that is used in the immersion treatment, it is preferable to satisfy the conditions of pH of the chemical treatment liquid.

It is preferable that a temperature of the chemical treatment liquid is equal to or higher than 5° C. and lower than 90° C. In a case where the temperature of the chemical treatment liquid is lower than 5° C., formation efficiency of the chemical treatment layer 107 is poor, and is not economically efficient. Accordingly, this case is not preferable. Furthermore, in a case where the temperature of the chemical treatment liquid is 90° C. or higher, a structure of the chemical treatment layer 107 that is formed is not uniform, and a defect such as cracking and a micro-crack occurs. The defect becomes the origin of corrosion and the like, and thus this case is not preferable. In addition, even in any of the chemical treatment liquid that is used in the electrolytic treatment and the chemical treatment liquid that is used in the immersion treatment, it is preferable to satisfy the temperature conditions of the chemical treatment liquid.

Furthermore, when the temperature of the chemical treatment liquid is set to be higher than a surface temperature of the steel sheet 103 on which the Fe—Sn alloy layer 105a and the Sn layer 105b are formed, reactivity of the chemical treatment liquid increases at an interface, and thus adhesion efficiency of the chemical treatment layer 107 is improved. According to this, it is preferable that the temperature of the chemical treatment liquid is higher than the surface temperature of the steel sheet 103 on which the Fe—Sn alloy layer 105a and the Sn layer 105b are formed.

[Case of Forming Chemical Treatment Layer 107 by Electrolytic Treatment]

It is preferable that a current density in the electrolytic treatment is 0.5 A/dm$^2$ to 20 A/dm$^2$. In a case where the current density is less than 0.5 A/dm$^2$, the adhered amount of the chemical treatment layer 107 decreases, and an electrolytic treatment time may be longer, and thus this case is not preferable. In addition, in a case where the current density is greater than 20 A/dm$^2$, the adhered amount of the chemical treatment layer 107 becomes excessive, and in the chemical treatment layer 107 that is formed, a portion that is not sufficiently adhered may be washed out (peeled off) in a washing process through water washing after the electrolytic treatment. Accordingly, this case is not preferable.

It is preferable that the electrolytic treatment time is 0.05 seconds to 10 seconds. In a case where the electrolytic treatment time is shorter than 0.05 seconds, the adhered amount of the chemical treatment layer 107 decreases, and desired performance is not obtained. Accordingly, this case is not preferable. On the other hand, in a case where the electrolytic treatment time is longer than 10 seconds, the adhered amount of the chemical treatment layer 107 becomes excessive, and in the chemical treatment layer 107 that is formed, a portion that is not sufficiently adhered may be washed out (peeled off) in a washing process through water washing after the electrolytic treatment. Accordingly, this case is not preferable.

[Case of Forming Chemical Treatment Layer 107 by Immersion Treatment]

The chemical treatment layer 107 according to this embodiment may be formed through an immersion treatment using the chemical treatment liquid. In a case of forming the chemical treatment layer 107 through the immersion treatment, the steel sheet 103 including the Fe—Sn alloy layer 105a and the Sn layer 105b is immersed in the above-described chemical treatment liquid for 0.2 to 100 seconds.

In a case where an immersion time is shorter than 0.2 seconds, the adhered amount of the chemical treatment layer 107 is not sufficient, and thus this case is not preferable. On the other hand, in a case where the immersion time is longer than 100 seconds, the adhered amount of the chemical treatment layer 107 becomes excessive, and in the chemical treatment layer 107, a portion that is not sufficiently adhered may be washed out (peeled off) in a washing process through water washing after the electrolytic treatment. Accordingly, this case is not preferable.

Furthermore, in formation of the chemical treatment layer according to this embodiment, tannic acid may be further added to the chemical treatment liquid. When the tannic acid is added to the chemical treatment liquid, the tannic acid reacts with Fe in the steel sheet 103, and a film of tannic acid Fe is formed on the surface of the steel sheet 103. The film of the tannic acid Fe improves rust resistance and adhesion, and is preferable.

As a solvent of the chemical treatment liquid, for example, deionized water, distilled water, and the like can be used. Electric conductivity of the solvent of the chemical treatment liquid is preferably 10 μS/cm or less, more preferably 5 μS/cm or less, and still more preferably 3 μS/cm or less. However, the solvent of the chemical treatment liquid is not limited thereto, and can be appropriately selected in accordance with a material to be dissolved, a formation method, formation conditions of the chemical treatment layer 107, and the like. However, it is preferable to use deionized water or distilled water from aspects of industrial productivity based on stability in an adhered amount of each component, cost, and environment.

As a supply source of Zr, for example, a Zr complex such as $H_2ZrF_6$ can be used. Zr in the Zr complex exists as $Zr^{4+}$ in the chemical treatment liquid through a hydrolysis reaction in accordance with an increase in pH at a cathode electrode interface. The Zr ions perform dehydration and condensation reaction with a hydroxyl group (—OH) that exists on a metal surface in the chemical treatment liquid to form a compound such as $ZrO_2$ and $Zr_3(PO_4)_4$.

[Post-Treatment Process]

Then, a known post-treatment is performed as necessary with respect to the steel sheet 103 on which the Fe—Sn alloy layer 105a, the Sn layer 105b and the chemical treatment layer 107 are formed (step S107).

Through the treatment performed in this flow, the chemical treatment steel sheet 10 according to this embodiment is produced.

EXAMPLES

Hereinafter, the chemical treatment steel sheet and the method of producing the chemical treatment steel sheet according to this embodiment of the invention will be described in detail with reference to Examples. In addition, the following Examples are examples of the chemical treatment steel sheet and the method of producing the chemical treatment steel sheet according to the embodiment of the invention, and the chemical treatment steel sheet and the method of producing the chemical treatment steel sheet according to the embodiment of the invention are not limited to the following examples.

Example 1

Hereinafter, first, verification was made as to how the YI value varies before and after storage for 4 weeks in an environment of a temperature of 40° C. and a humidity of 80% while varying the amount of Zr contained in the chemical treatment layer. Furthermore, the amount of Zr contained and the YI value were measured by the above-described method.

In Example 1, a steel sheet, which is typically used as a steel sheet for containers, was used as a base metal, and the Fe—Sn alloy layer and the Sn layer were formed on the steel sheet. The total amount of Sn contained in the Fe—Sn alloy layer and the Sn layer was 2.8 g/m$^2$ per single surface in terms of the amount of metal Sn. Furthermore, a plurality of samples including chemical treatment layers, in which the amounts of Zr compounds contained were different from each other, were produced by changing the concentration of Zr ions in the chemical treatment liquid. Here, the amount of phosphate compounds contained in each sample was set to 3.0 mg/m$^2$ per single surface in terms of the amount of P.

Figure 3:
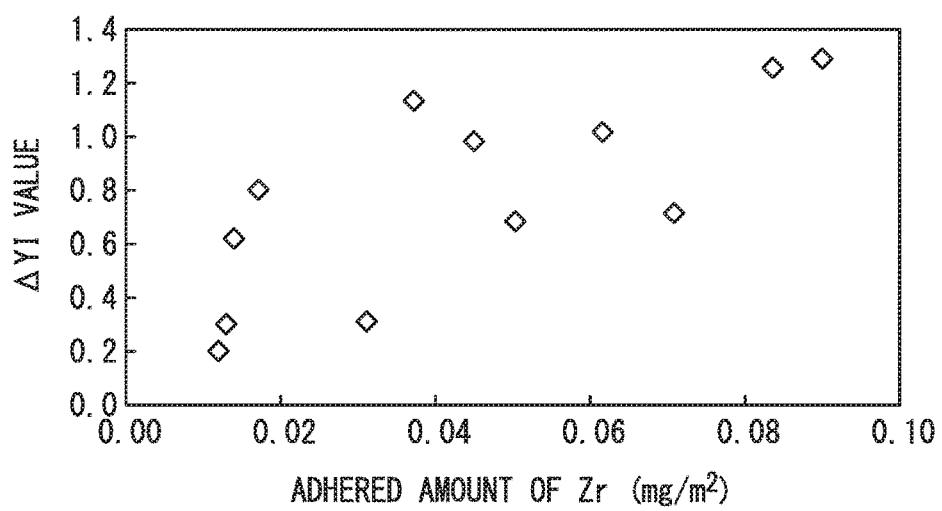
FIG. 3 is a graph showing a result of Example 1.

Obtained Results are shown in FIG. 3.

In FIG. 3, the horizontal axis represents the amount of Zr compounds (the amount of metal Zr) contained in the chemical treatment layer, and the vertical axis represents a value (ΔYI value) obtained by subtracting a YI value before storage from a YI value after storage. As is clear from FIG. 3, in a case where the amount of Zr contained was 0.01 to 0.10 mg/m$^2$ per single surface in terms of the amount of metal Zr, the ΔYI value was 1.7 or less, and an increase in the yellowness index in accordance with storage with the passage of time was not recognized.

From the results, when the amount of Zr compounds contained in the chemical treatment layer was set to the predetermined range, it could be seen that the produced chemical treatment steel sheet 10 had excellent yellowing resistance.

From the results, when the amount of Zr compounds contained in the chemical treatment layer was set to the predetermined range, it could be seen that the produced chemical treatment steel sheet 10 had excellent yellowing resistance.

Example 2

Next, a steel sheet, which is typically used as a steel sheet for containers, was used as a base metal, the Fe—Sn alloy layer and the Sn layer are formed on the steel sheet. The total amount of Sn contained in the Fe—Sn alloy layer and the Sn layer is shown in Table 1. Subsequently, the chemical treatment layer was formed on the Sn layer. The amount of metal Zr and the amount of P in the chemical treatment layer is shown in Table 1.

With respect to respective samples which were produced as described above, the ΔYI value before and after storage for 4 weeks in an environment of a temperature of 40° C. and a humidity of 80% was measured. The ΔYI value were measured by the above-described method.

<Evaluation of Corrosion Resistance>

As a corrosion resistance test liquid, 3% acetic acid was used. The chemical treatment steel sheet as the sample was cut out to a dimension of ϕ35 mm. The cut-out sample was placed on an inlet of a heat resistant bottle into which the corrosion resistance test liquid was put, and was fixed thereto. After performing a heat treatment at 121° C. for 60 minutes, a contact portion between the sample and the corrosion resistance test liquid was observed to evaluate the degree of corrosion of the sample. Specifically, the following ten-step evaluation was performed by using an area of a portion that is not corroded with respect to the total area of the contact portion between the sample and the corrosion resistance test liquid. Furthermore, a score is 5 points or greater, the steel sheet can be used as a steel sheet for container.

10 points: 100% to 90%
9 points: less than 90% and equal to or greater than 80%
8 points: less than 80% and equal to or greater than 70%
7 points: less than 70% and equal to or greater than 60%
6 points: less than 60% and equal to or greater than 50%
5 points: less than 50% and equal to or greater than 40%
4 points: less than 40% and equal to or greater than 30%
3 points: less than 30% and equal to or greater than 20%
2 points: less than 20% and equal to or greater than 10%
1 point: less than 10% and equal to or greater than 0%

In a corrosion resistance evaluation item, 10 points to 9 points are described as "Very Good", 8 points to 5 points are described as "Good", and 4 points or less are described as "Not Good".

TABLE 1

|  |  | Chemical treatment steel sheet | | | | |
|---|---|---|---|---|---|---|
|  |  | Coated layer | Chemical treatment layer | | Characteristic evaluation | |
|  | Symbol | Amount of metal Sn (g/m$^2$) | Amount of metal Zr (mg/m$^2$) | Amount of P (mg/m$^2$) | Corrosion resistance | ΔYI value |
| Examples | A1 | 0.12 | 0.06 | 2.0 | Good | 1.0 |
|  | A2 | 14.2 | 0.08 | 2.1 | Very Good | 1.3 |
|  | A3 | 2.6 | 0.014 | 2.4 | Very Good | 0.6 |
|  | A4 | 10.3 | 0.09 | 1.8 | Very Good | 1.3 |
|  | A5 | 4.4 | 0.013 | 0.017 | Very Good | 0.3 |
|  | A6 | 6.7 | 0.02 | 4.7 | Very Good | 0.8 |
|  | A7 | 9.7 | 0.045 | 2.7 | Very Good | 1.0 |
|  | A8 | 9.9 | 0.04 | 3.8 | Very Good | 1.1 |
|  | A9 | 6.6 | 0.05 | 0.9 | Very Good | 0.7 |
|  | A10 | 5.9 | 0.07 | 0.025 | Very Good | 0.7 |

TABLE 1-continued

| | | Chemical treatment steel sheet | | | | |
| | | Coated layer | Chemical treatment layer | | Characteristic evaluation | |
| | Symbol | Amount of metal Sn (g/m$^2$) | Amount of metal Zr (mg/m$^2$) | Amount of P (mg/m$^2$) | Corrosion resistance | ΔYI value |
|---|---|---|---|---|---|---|
| | A11 | 1.0 | 0.03 | 0.9 | Very Good | 0.3 |
| | A12 | 1.2 | 0.01 | 0.2 | Very Good | 0.2 |
| Comparative Examples | a1 | 0.04 | 0.20 | 3.6 | Not Good | 3.1 |
| | a2 | 12.9 | 0.004 | 0.012 | Very Good | 5.2 |
| | a3 | 21.0 | 0.02 | 0.003 | Very Good | 5.5 |

As shown in Table 1, in Examples A1 to A12, the corrosion resistance and the yellowing resistance were excellent. On the other hand, in Comparative Examples a1 to a3, any one or both of the corrosion resistance and the yellowing resistance was poor.

Example 3

A steel sheet, which is typically used as a steel sheet for containers, was used as a base metal, and a chemical treatment was performed on a Fe—Sn alloy layer and a Sn layer having the amount of metal Sn as shown in the following Table 2 under conditions shown in the following Table 3 to form a chemical treatment layer. With respect to each sample, the corrosion resistance and the yellowing resistance were measured by the same method as described above.

Results are shown in Table 4.

TABLE 2

| | Symbol | Coated layer Amount of metal Sn (g/m$^2$) |
|---|---|---|
| Examples | B1 | 5.7 |
| | B2 | 10 |
| | B3 | 2.1 |
| | B4 | 8.1 |
| | B5 | 10 |
| | B6 | 6.4 |
| | B7 | 1.1 |
| | B8 | 1.1 |
| | B9 | 13 |
| | B10 | 10 |
| | B11 | 13 |
| | B12 | 12 |
| | B13 | 12 |
| | B14 | 14 |
| | B15 | 3.2 |
| | B16 | 8.9 |
| | B17 | 15 |
| | B18 | 6.3 |
| | B19 | 11 |
| | B20 | 12 |
| | B21 | 10 |
| | B22 | 12 |
| | B23 | 1.5 |
| | B24 | 5.0 |
| | B25 | 10 |
| | B26 | 13 |
| | B27 | 0.8 |
| | B28 | 15 |
| | B29 | 1.6 |
| | B30 | 10 |
| Comparative Examples | b1 | 5.3 |
| | b2 | 14 |
| | b3 | 15 |
| | b4 | 6.6 |
| | b5 | 4.4 |
| | b6 | 12 |
| | b7 | 1.6 |
| | b8 | 14 |
| | b9 | 1.6 |

TABLE 3

| | | Chemical treatment | | | | | | | Immersion treatment |
| | | Chemical treatment bath | | | | | | Electrolytic treatment | |
| | Symbol | Zr ion (ppm) | F ion (ppm) | Phosphate ion (ppm) | Nitrate ion (ppm) | Sulfate ion (ppm) | Bath temperature (°C.) | Current (A/dm$^2$) | Time (sec) | Time (sec) |
|---|---|---|---|---|---|---|---|---|---|---|
| Examples | B1 | 11 | 4502 | 2417 | 7511 | 2347 | 40 | 12 | 9.6 | — |
| | B2 | 498 | 6845 | 2970 | 11436 | 271 | 26 | 15 | 7.7 | — |
| | B3 | 246 | 10 | 2654 | 3330 | 15635 | 26 | 7.4 | 1.4 | — |
| | B4 | 45 | 19834 | 1045 | 8438 | 6822 | 67 | 19 | 9.4 | — |
| | B5 | 148 | 5049 | 11 | 2114 | 9613 | 82 | 10 | 1.0 | — |
| | B6 | 493 | 18930 | 29384 | 4769 | 7819 | 88 | 4.5 | 0.6 | — |
| | B7 | 198 | 5893 | 447 | 104 | — | 50 | 13 | 8.6 | — |
| | B8 | 26 | 16494 | 260 | 29183 | — | 55 | 14 | 3.9 | — |

TABLE 3-continued

| | | Chemical treatment | | | | | | | |
|---|---|---|---|---|---|---|---|---|---|
| | | Chemical treatment bath | | | | | Electrolytic treatment | | Immersion treatment |
| | Symbol | Zr ion (ppm) | F ion (ppm) | Phosphate ion (ppm) | Nitrate ion (ppm) | Sulfate ion (ppm) | Bath temperature (°C.) | Current (A/dm²) | Time (sec) | Time (sec) |
| | B9 | 225 | 11088 | 1361 | — | 109 | 36 | 7.8 | 5.2 | — |
| | B10 | 67 | 11623 | 2424 | — | 29384 | 11 | 11 | 9.8 | — |
| | B11 | 53 | 4790 | 799 | 1994 | 4575 | 6 | 13 | 4.2 | — |
| | B12 | 292 | 2284 | 977 | 10142 | 2391 | 89 | 4.2 | 0.5 | — |
| | B13 | 373 | 4914 | 428 | 2612 | 8253 | 58 | 0.6 | 4.7 | — |
| | B14 | 12 | 1150 | 1752 | 5522 | 5581 | 32 | 19 | 5.2 | — |
| | B15 | 362 | 9569 | 2159 | 7347 | 11536 | 28 | 12.2 | 0.06 | — |
| | B16 | 188 | 12891 | 2393 | 9696 | 2550 | 70 | 5.4 | 9.8 | — |
| | B17 | 365 | 11670 | 430 | 11017 | 557 | 78 | — | — | 0.23 |
| | B18 | 71 | 8528 | 2528 | 1383 | 3375 | 71 | — | — | 98.2 |
| | B19 | 108 | 15216 | 2963 | 707 | 908 | 27 | 19.6 | 4.1 | — |
| | B20 | 382 | 4923 | 2834 | 3847 | 2532 | 35 | 15.3 | 5.3 | — |
| | B21 | 391 | 104 | 2802 | 961 | 16123 | 43 | 16.1 | 5.2 | — |
| | B22 | 299 | 16723 | 1674 | 11373 | 8290 | 63 | 18.7 | 7.5 | — |
| | B23 | 47 | 8855 | 20 | 17999 | 1263 | 58 | 6.7 | 3.6 | — |
| | B24 | 437 | 18400 | 1909 | 23041 | 4648 | 48 | 10.9 | 2.1 | — |
| | B25 | 70 | 7503 | 2109 | 683 | 39 | 90 | 10.3 | 5.6 | — |
| | B26 | 142 | 2649 | 2713 | 19284 | 28 | 65 | 10.2 | 4.4 | — |
| | B27 | 475 | 1546 | 66 | 78 | 983 | 81 | 4.7 | 2.6 | — |
| | B28 | 65 | 15006 | 1639 | 48 | 19612 | 29 | 3.6 | 7.6 | — |
| | B29 | 418 | 7502 | 277 | 5606 | 15419 | 40 | 9.1 | 5.9 | — |
| | B30 | 93 | 12474 | 1581 | 16262 | 7721 | 55 | 4.8 | 8.7 | — |
| Comparative Examples | b1 | 890 | 26340 | 326 | 2546 | 12929 | 76 | 1.1 | 8.3 | — |
| | b2 | 4 | 3 | 1201 | 9249 | 10129 | 59 | 3.1 | 9.0 | — |
| | b3 | 322 | 6537 | 2 | 33532 | 32039 | 43 | 3.7 | 0.2 | — |
| | b4 | 393 | 7286 | 3325 | 43 | 18 | 97 | 2.2 | 9.8 | — |
| | b5 | 152 | 8345 | 2076 | 14856 | 8024 | 2 | 34 | 7.0 | — |
| | b6 | 130 | 13783 | 48 | 5887 | 8899 | 72 | 0.3 | 13.7 | — |
| | b7 | 435 | 3744 | 275 | 2117 | 2848 | 84 | 18.8 | 0.02 | — |
| | b8 | 187 | 13886 | 1770 | 240 | 2950 | 23 | — | — | 0.08 |
| | b9 | 4 | 5602 | 177 | 3606 | 5418 | 35 | — | — | 135 |

TABLE 4

| | | Chemical treatment layer | | | |
|---|---|---|---|---|---|
| | | Amount of | Amount | Characteristic evaluation | |
| | Symbol | metal Zr (mg/m²) | of P (mg/m²) | Corrosion resistance | ΔYI value |
| Examples | B1 | 0.04 | 4.5 | Very Good | 1.3 |
| | B2 | 0.04 | 1.7 | Very Good | 0.8 |
| | B3 | 0.05 | 0.9 | Very Good | 0.7 |
| | B4 | 0.07 | 1.8 | Very Good | 1.1 |
| | B5 | 0.02 | 0.9 | Very Good | 0.4 |
| | B6 | 0.03 | 0.6 | Very Good | 0.4 |
| | B7 | 0.04 | 3.8 | Very Good | 1.2 |
| | B8 | 0.02 | 2.8 | Very Good | 0.7 |
| | B9 | 0.01 | 0.8 | Very Good | 0.3 |
| | B10 | 0.04 | 2.8 | Very Good | 1.0 |
| | B11 | 0.02 | 0.6 | Very Good | 0.3 |
| | B12 | 0.02 | 3.3 | Very Good | 0.9 |
| | B13 | 0.02 | 1.9 | Very Good | 0.6 |
| | B14 | 0.04 | 3.3 | Very Good | 1.1 |
| | B15 | 0.02 | 3.0 | Very Good | 0.8 |
| | B16 | 0.02 | 3.2 | Very Good | 0.8 |
| | B17 | 0.03 | 0.4 | Very Good | 0.4 |
| | B18 | 0.08 | 2.9 | Very Good | 1.4 |
| | B19 | 0.03 | 1.0 | Very Good | 0.5 |
| | B20 | 0.03 | 1.2 | Very Good | 0.5 |
| | B21 | 0.03 | 3.6 | Very Good | 1.0 |
| | B22 | 0.04 | 3.4 | Very Good | 1.1 |
| | B23 | 0.02 | 0.8 | Very Good | 0.4 |
| | B24 | 0.02 | 2.0 | Very Good | 0.6 |
| | B25 | 0.04 | 0.7 | Very Good | 0.5 |
| | B26 | 0.02 | 3.6 | Very Good | 0.9 |
| | B27 | 0.04 | 1.5 | Very Good | 0.7 |
| | B28 | 0.02 | 2.0 | Very Good | 0.6 |
| | B29 | 0.06 | 1.8 | Very Good | 1.0 |
| | B30 | 0.02 | 3.3 | Very Good | 0.8 |
| Comparative Examples | b1 | 0.007 | 2.7 | Very Good | 5.0 |
| | b2 | 0.007 | 2.7 | Very Good | 6.5 |
| | b3 | 0.02 | 0.002 | Very Good | 5.1 |
| | b4 | 0.006 | 4.5 | Very Good | 5.7 |
| | b5 | 0.008 | 1.2 | Very Good | 4.8 |
| | b6 | 0.005 | 0.2 | Very Good | 5.4 |
| | b7 | 0.003 | 2.2 | Very Good | 5.2 |
| | b8 | 0.004 | 1.7 | Very Good | 7.2 |
| | b9 | 0.002 | 1.7 | Very Good | 7.2 |

As shown in Table 4, in Examples B1 to B30, the corrosion resistance and the yellowing resistance were excellent. On the other hand, in Comparative Examples b1 to b9, the corrosion resistance was excellent, but the yellowing resistance was poor.

Hereinbefore, preferred embodiment of the invention has been described in detail with reference to the accompanying drawings, but the invention is not limited to the example. It should be understood by those skilled in the art that various modification examples and variations may be made in a scope of the technical sprit described in claims, and these also pertain to the technical scope of the invention.

INDUSTRIAL APPLICABILITY

According to the embodiment, it is possible to provide a chemical treatment steel sheet having excellent yellowing resistance and corrosion resistance, and a method for producing the chemical treatment steel sheet.

BRIEF DESCRIPTION OF THE REFERENCE SYMBOLS

10: CHEMICAL TREATMENT STEEL SHEET
103: STEEL SHEET
105a: Fe—Sn ALLOY LAYER
105b: Sn layer
107: CHEMICAL TREATMENT LAYER

What is claimed is:

1. A chemical treatment steel sheet comprising:
a steel sheet;
a Fe—Sn alloy layer which is formed on at least one surface of the steel sheet;
an Sn layer which is formed on the Fe—Sn alloy layer; and
a chemical treatment layer that is formed on the Sn layer, and consists of 0.01 to 0.1 mg/m$^2$ of Zr compounds in terms of an amount of metal Zr, 0.01 to 5 mg/m$^2$ of phosphate compounds in terms of an amount of P, and unavoidable impurities,
wherein a total Sn content of the Fe—Sn alloy layer and the Sn layer is 0.1 to 15 g/m$^2$ of Sn in terms of an amount of metal Sn.

2. The chemical treatment steel sheet according to claim 1,
wherein the chemical treatment layer contains 0.08 mg/m$^2$ or less of the Zr compounds in terms of the amount of metal Zr.

3. The chemical treatment steel sheet according to claim 2,
wherein the chemical treatment layer contains 0.06 mg/m$^2$ or less of the Zr compounds in terms of the amount of metal Zr.

4. The chemical treatment steel sheet according to claim 1,
wherein the chemical treatment layer contains 0.02 mg/m$^2$ or greater of the Zr compounds in terms of the amount of metal Zr.

5. The chemical treatment steel sheet according to claim 1,
wherein the chemical treatment layer contains 4 mg/m$^2$ or less of the phosphate compounds in terms of the amount of P.

6. The chemical treatment steel sheet according to claim 1,
wherein the chemical treatment layer contains less than 1 mg/m$^2$ of the phosphate compounds in terms of the amount of P.

7. The chemical treatment steel sheet according to claim 1,
wherein the chemical treatment layer contains 0.03 mg/m$^2$ or greater of the phosphate compounds in terms of the amount of P.

8. The chemical treatment steel sheet according to claim 1,
wherein when a variation amount in a yellowness index before and after storage for 4 weeks in an environment of a temperature of 40° C. and a humidity of 80% at one measurement point on an outermost surface of the chemical treatment layer is defined as $\Delta YI$, an average value of the $\Delta YI$ obtained at the measurement points included in a unit area of the outermost surface is less than 1.7.

9. The chemical treatment steel sheet according to claim 1,
wherein the total Sn content of the Fe-Sn alloy layer and the Sn layer is 0.5 to 13 g/m$^2$ of Sn in terms of an amount of metal Sn.

10. The chemical treatment steel sheet according to claim 1,
wherein a surface of the chemical treatment layer is not coated with a film or a coating.

11. A method for producing the chemical treatment steel sheet according to claim 1, comprising:
a plating process of forming an Sn coated layer that contains 0.1 to 15 g/m$^2$ of Sn in terms of the amount of metal Sn on a surface of a steel sheet;
a reflow process of forming an Fe—Sn alloy layer and an Sn layer by performing a reflow treatment to the Sn coated layer; and
a chemical treatment process of forming a chemical treatment layer on the Sn layer by performing an electrolytic treatment in a chemical treatment liquid, which contains equal to or greater than 10 ppm and less than 500 ppm of Zr ions, 10 to 20000 ppm of F ions, 10 to 3000 ppm of phosphate ions, and 100 to 30000 ppm in a total amount of nitrate ions and sulfate ions and of which a temperature is set to equal to or higher than 5° C. and lower than 90° C., under conditions of a current density of 0.5 to 20 A/dm$^2$ and an electrolytic treatment time of 0.05 to 10 seconds, or by performing an immersion treatment in the chemical treatment liquid for an immersion time of 0.2 to 100 seconds.

12. The method for producing a chemical treatment steel sheet according to claim 11,
wherein the chemical treatment liquid contains 100 ppm to less than 500 ppm of Zr ions, 100 to 17000 ppm of F ions, 20 to 2000 ppm of phosphate ions, and 1000 to 20000 ppm in a total amount of nitrate ions and sulfate ions.

* * * * *